UNITED STATES PATENT OFFICE.

NILS J. TORKELSEN, OF OAKLAND, CALIFORNIA.

PREPARING A PRESERVED MEAT COMPOUND.

1,088,944.     Specification of Letters Patent.     Patented Mar. 3, 1914.

No Drawing.     Application filed July 9, 1913. Serial No. 778,187.

*To all whom it may concern:*

Be it known that I, NILS J. TORKELSEN, a citizen of the United States, residing at Oakland, in the county of Alameda and State of California, have invented certain new and useful Improvements in Preparing a Preserved Meat Compound, of which the following is a specification.

My invention provides an improved process of preparing a preserved meat compound and provides a meat compound which may be kept for a length of time without danger of spoiling and yet, when eaten is of a palatable and nutritious nature.

In the preferred method of compounding and preparing the ingredients comprising my invention, I proceed in the following manner: To 8 ounces of beef, 5 ounces of pork and 3 ounces of veal I add a small amount of salt and a small amount of saltpeter the amounts of these two last-named ingredients being variable according to conditions. I now chop this mixture in any manner by which all the ingredients may be intimately mixed together and during the operation of chopping I add a small amount of water to aid the salt and saltpeter in suitably impregnating the meats. I now allow this mixture to set for twelve hours so that the salt and saltpeter may have a proper effect on the meats. This mixture is again intimately chopped and mixed with maize, black pepper, and nutmeg, in quantities to properly flavor and at this point I add 2 ounces of cornstarch, 1 ounce of cornflour and enough water to give the right consistency to the compound. I now place this compound on a piece of cheese-cloth and place upon it an ox tongue split in two pieces with a strip of fat bacon, disposed between the two pieces. The meat compound is carefully packed around the ox tongue and rolled up in a cloth, the roll then being tied at each end. These rolls are boiled for three hours and then pressed for twelve hours. They are then hermetically sealed by dipping them into hot paraffin and allowed to set for another twelve hours after which the product is ready for use. This compound is highly nutritive and palatable and may be kept for an indefinite time.

Variations in the steps of preparation and amounts of ingredients used may be made without departing from the spirit of my invention, and I do not limit myself to the exact steps and proportion of ingredients herein set forth.

I claim by Letters Patent of the United States of America:

1. The process of preparing a meat compound which consists in preparing a mixture of 8 ounces beef, 5 ounces pork, 3 ounces veal, chopped intimately together with a suitable quantity of salt and saltpeter and allowing the mixture to set for substantially 12 hours and then chopping intimately together with 2 ounces of cornstarch and 1 ounce of cornflour to each pound of meat and maize, nutmeg, black pepper and ginger in quantities sufficient to produce a desired flavor and rolling this mixture in a suitable covering and boiling for three hours and then pressing it and packing it in such a manner as to exclude the air.

2. The process of preparing a meat product which consists in preparing a mixture of 8 ounces beef, 5 ounces pork, 3 ounces veal, chopped intimately together with a suitable quantity of salt and saltpeter and allowed to set for substantially 12 hours, and then chopping the same intimately together with 2 ounces of cornstarch and 1 ounce of cornflour to each pound of meat, and maize, nutmeg, black pepper and ginger in quantities sufficient to produce a desired flavor, then making the mixture into rolls having at their center an ox tongue split in two with a strip of fat bacon disposed between the two parts of the said ox tongue and rolling the said rolls in cheese cloth and tying both ends, then boiling for substantially 3 hours when they are removed, pressed and dipped in melted paraffin.

In testimony whereof I affix my signature in presence of two witnesses.

NILS J. TORKELSEN.

Witnesses:
F. P. SCHROEDER,
R. M. OYARZO.